(12) United States Patent
Jorgensen et al.

(10) Patent No.: US 12,181,095 B2
(45) Date of Patent: Dec. 31, 2024

(54) EXPANDABLE TAPERED PIN PLUG FOR HEAT EXCHANGERS AND AIR COOLED HEAT EXCHANGERS

(71) Applicant: JNT Technical Services, Inc., Little Ferry, NJ (US)

(72) Inventors: Glenn F. Jorgensen, Little Ferry, NJ (US); Ryan J. Jorgensen, Little Ferry, NJ (US)

(73) Assignee: JNT Technical Services, Inc., Little Ferry, NJ (US)

( * ) Notice: Subject to any disclaimer, the term of this patent is extended or adjusted under 35 U.S.C. 154(b) by 33 days.

(21) Appl. No.: 17/825,609

(22) Filed: May 26, 2022

(65) Prior Publication Data
US 2022/0381389 A1 Dec. 1, 2022

Related U.S. Application Data

(60) Provisional application No. 63/195,288, filed on Jun. 1, 2021.

(51) Int. Cl.
*F16L 55/11* (2006.01)
*F28F 11/02* (2006.01)

(52) U.S. Cl.
CPC .......... *F16L 55/1141* (2013.01); *F28F 11/02* (2013.01)

(58) Field of Classification Search
CPC ...... B65D 39/04; B65D 39/12; E21D 21/008; F02B 77/005; F16B 7/02; F16B 7/025; F16B 7/1463; F16B 13/045; F16B 13/06; F16B 13/063; F16B 13/124; F16B 2013/006; F16B 2013/009; F16L 55/11; F16L 55/1108; F16L 55/1141; F16L 55/12; F16L 55/128; F16L 55/1286; F16L 55/13; F16L 55/132; F16L 55/136; F16L 55/1612; F28F 9/06; F28F 9/08; F28F 11/00; F28F 11/02; F28F 11/04; F28F 11/06; Y10T 29/4994; Y10T 29/49911; Y10T 403/76
USPC .......... 4/295; 138/89; 166/71, 139; 215/212, 215/279, 358, 360, 361, 362; 217/110; 220/233, 234, 235, 237; 411/54, 55, 69
See application file for complete search history.

(56) References Cited

U.S. PATENT DOCUMENTS

| | | | | |
|---|---|---|---|---|
| 626,040 A | * | 5/1899 | Rowlands | A47K 10/12 248/231.91 |
| 2,760,399 A | * | 8/1956 | Rea | F16B 37/00 29/524.1 |
| 2,947,556 A | * | 8/1960 | Wenger | F16B 7/1463 248/161 |
| 3,119,177 A | * | 1/1964 | Knecht | F28F 9/16 29/402.09 |

(Continued)

FOREIGN PATENT DOCUMENTS

GB 2265962 A * 10/1993 ............ F16L 55/132

*Primary Examiner* — David R Deal
(74) *Attorney, Agent, or Firm* — David L. Nocilly; Bond Schoeneck & King PLLC

(57) ABSTRACT

A tube plug for securely sealing a tube to be plugged. The tube plug has a housing member with a non-cylindrical body and a deformable wall. An insert member having a threaded shank and a ramped ferrule can be threaded into the body to deform the deformable wall outwardly and into engagement with the tube to be sealed. The non-cylindrical body allow the plug to be inserted into and used to plug a tube that is in a difficult to reach location and whose diameter may not be precisely known.

14 Claims, 8 Drawing Sheets

(56) References Cited

U.S. PATENT DOCUMENTS

| | | | | |
|---|---|---|---|---|
| 3,929,250 A * | 12/1975 | Abbate | ................. | B60K 15/00 |
| | | | | 411/908 |
| 4,086,840 A * | 5/1978 | Kurlander | ............... | F16B 13/06 |
| | | | | 411/34 |
| 4,114,654 A * | 9/1978 | Richardson | ............ | F16L 13/11 |
| | | | | 165/76 |
| 4,195,547 A * | 4/1980 | Giannuzzi | ............. | F16B 13/045 |
| | | | | 411/54 |
| 4,237,937 A * | 12/1980 | Healy, Sr. | ............... | F16L 55/11 |
| | | | | 165/76 |
| 4,390,042 A * | 6/1983 | Kucherer | ................ | F16L 55/13 |
| | | | | 29/523 |
| 4,513,786 A * | 4/1985 | Sodergren | ............. | F16L 55/13 |
| | | | | 29/523 |
| 4,637,436 A * | 1/1987 | Stewart, Jr. | ............ | B21D 39/06 |
| | | | | 165/76 |
| 5,289,851 A * | 3/1994 | Jorgensen | ........... | F16L 55/1108 |
| | | | | 220/234 |
| 5,456,290 A * | 10/1995 | Haberman | .............. | F16L 55/13 |
| | | | | 165/71 |
| 5,636,757 A * | 6/1997 | Porvaznik | ............. | B65D 39/16 |
| | | | | 220/793 |
| 5,664,901 A * | 9/1997 | Mayr | ................... | F16B 37/122 |
| | | | | 411/181 |
| 5,862,861 A * | 1/1999 | Kalsi | ..................... | F16L 55/132 |
| | | | | 166/387 |
| 6,076,797 A * | 6/2000 | Schnautz | ............ | B29C 45/7312 |
| | | | | 249/141 |
| 6,170,530 B1 * | 1/2001 | Steblina | ................ | F16L 55/132 |
| | | | | 138/90 |
| 6,883,547 B1 | 4/2005 | Jorgensen | | |
| 6,981,524 B2 | 1/2006 | Jorgensen | | |
| 9,194,527 B2 * | 11/2015 | Larsson | ................ | F16L 55/1108 |
| 9,709,346 B2 * | 7/2017 | Al-Otaibi | ............... | F16L 55/13 |
| 2011/0247786 A1 * | 10/2011 | Dixon | .................... | F28G 15/08 |
| | | | | 165/172 |
| 2019/0331279 A1 * | 10/2019 | Liekens | ............ | F16L 55/1108 |

* cited by examiner

EXPANDABLE TAPERED PIN PLUG FOR HEAT EXCHANGERS AND AIR COOLED HEAT EXCHANGERS

CROSS-REFERENCE TO RELATED APPLICATIONS

The present application claims priority to U.S. Provisional No. 63/195,288, filed on Jun. 1, 2021.

BACKGROUND OF THE INVENTION

1. Field of the Invention

The present invention relates to a plug used to remedy a leaking tube of a heat exchanger and, more particularly, to a tube plug that needs to be set in a difficult location.

2. Description of the Related Art

In the construction of boilers and other heat exchange equipment, such as those used in the power generation and chemical industries, there is often a need to seal leaking tubes, pipes and similar conduits that transport steam, liquid or gasses under pressure. This sealing is frequently accomplished by the insertion of a plug into the tube. For example, Applicant has disclosed several such plugs in U.S. Pat. Nos. 5,289,851, 6,883,547, and 6,981,524 that, upon insertion, will expand to sealingly engage the inner surface of a boiler or heat exchanger tube. In many heat exchangers, however, it is not possible to accurately measure the diameter of the tubes that need to be plugged or to use conventional cylindrical tube plugs as the diameters of the tubes to be plugged can vary widely and the location of tube means that it is impossible to position the cylindrical tube plug properly inside the end of the tube prior to securing it in place. As a result, the installation process is difficult and usually involves the use of a tapered plug that can fit different sized tubes and must be hammered into position, which can result in damage to the tubes to be plugged or the exchanger components. These taper plugs have a low pressure sealing capacity and it is difficult to achieve consistent installation criteria due to the variability of using an impact force from a hammer for installation. Accordingly, there is a need in the art for a plug that can be easily sized, positioned, and then installed with a predetermined amount of torque in tubes of various sizes that are in hard to access locations.

BRIEF SUMMARY OF THE INVENTION

The present invention is a tube plug that can be set into a tube to be plugged by tapping the plug into place and then secured in place by rotating a nut with a controllable amount of force, or predetermined rotations/predetermined depth, to seal the plug securely against the inner diameter of the tube. The present invention thus provides a plug that has all the benefits of a tapered plug, such as a large sizing tolerance and simple installation, while avoiding the drawbacks by providing better sealing capacity and consistent torque installation.

The tube plug of the present invention has a housing member having a non-cylindrical body extending along a longitudinal axis and including a deformable wall of a first outer diameter surrounding an inner bore of a first inner diameter and having a cylindrical body extending along the longitudinal axis and including a threaded bore of a second inner diameter. An insert member having a threaded shank corresponding to the threaded bore and a ramped ferrule is positioned to deform the deformable wall of the non-cylindrical body outwardly when the threaded shank is advanced into the threaded bore by rotating the nut.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
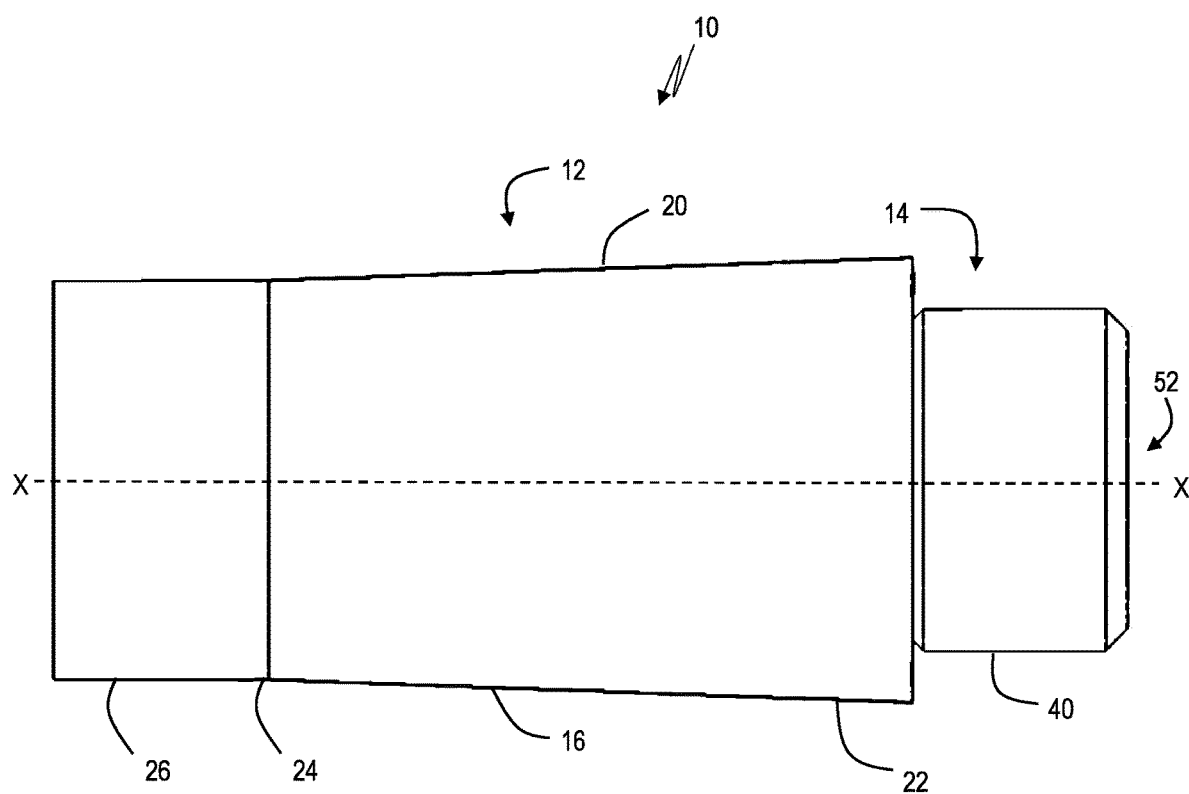
FIG. 1 is a side view of a tube plug according to the present invention.
Figure 2:
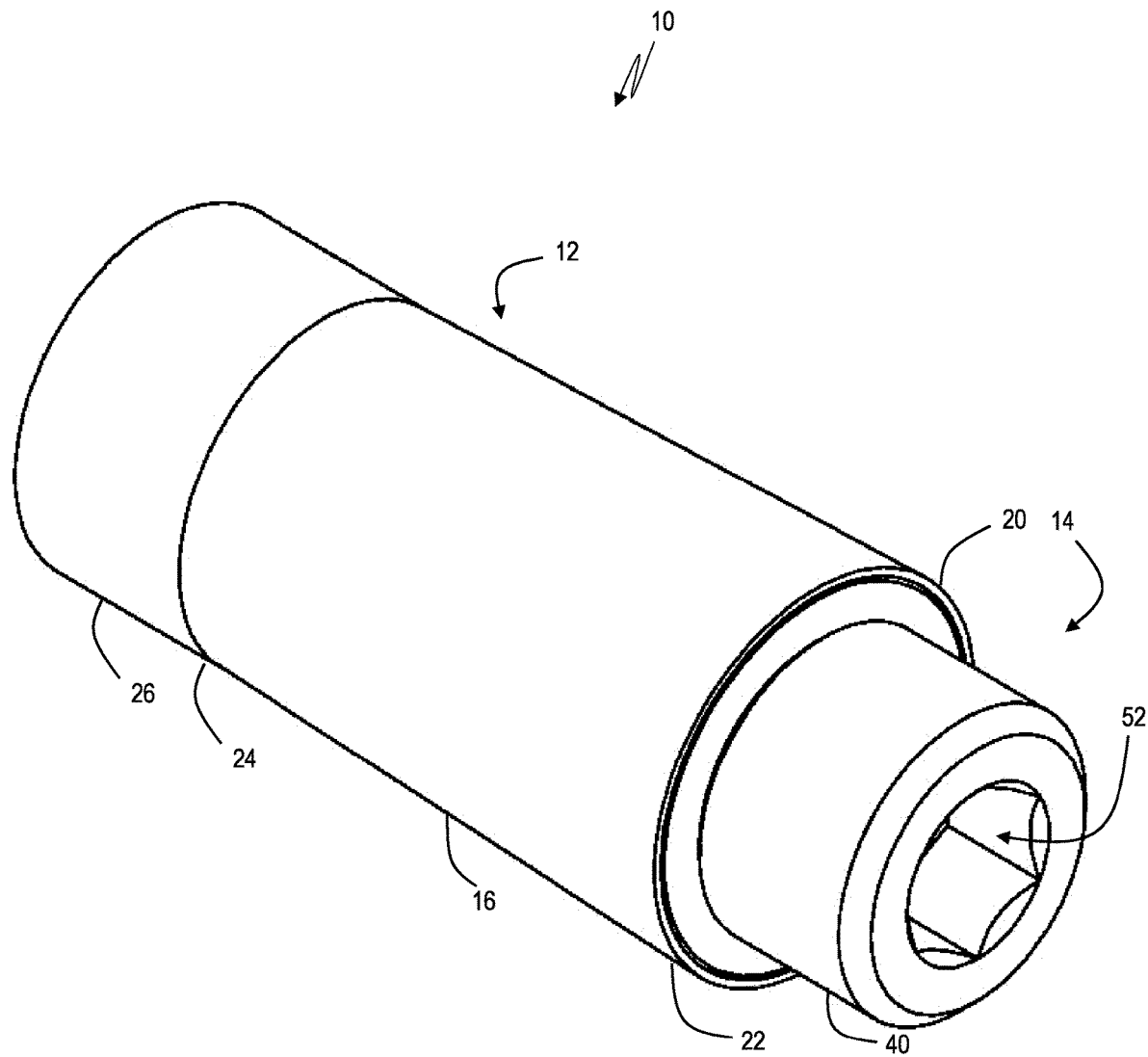
FIG. 2 is a perspective view of a tube plug according to the present invention.
Figure 3:
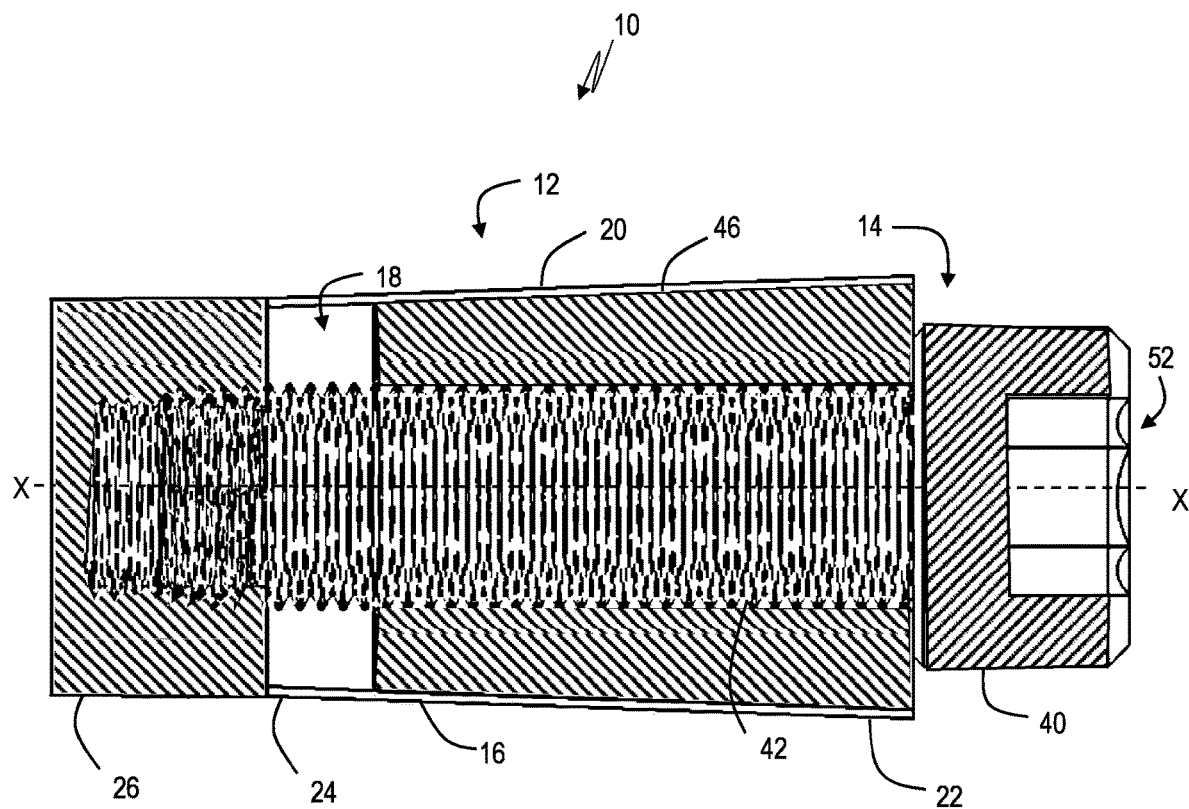
FIG. 3 is a longitudinal cross-section of a tube plug according to the present invention.
Figure 4:
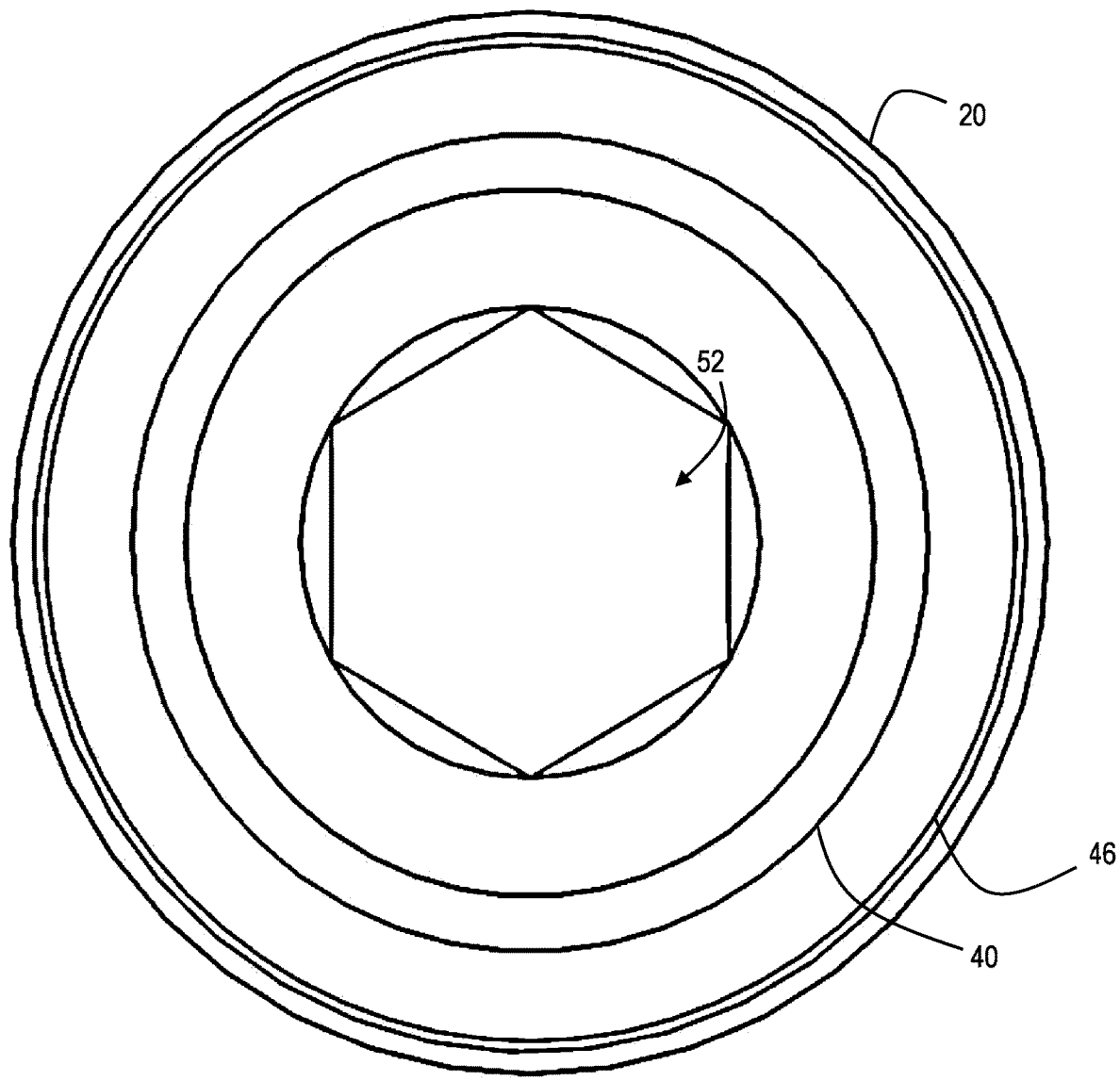
FIG. 4 is a rear view of a tube plug according to the present invention.
Figure 5:
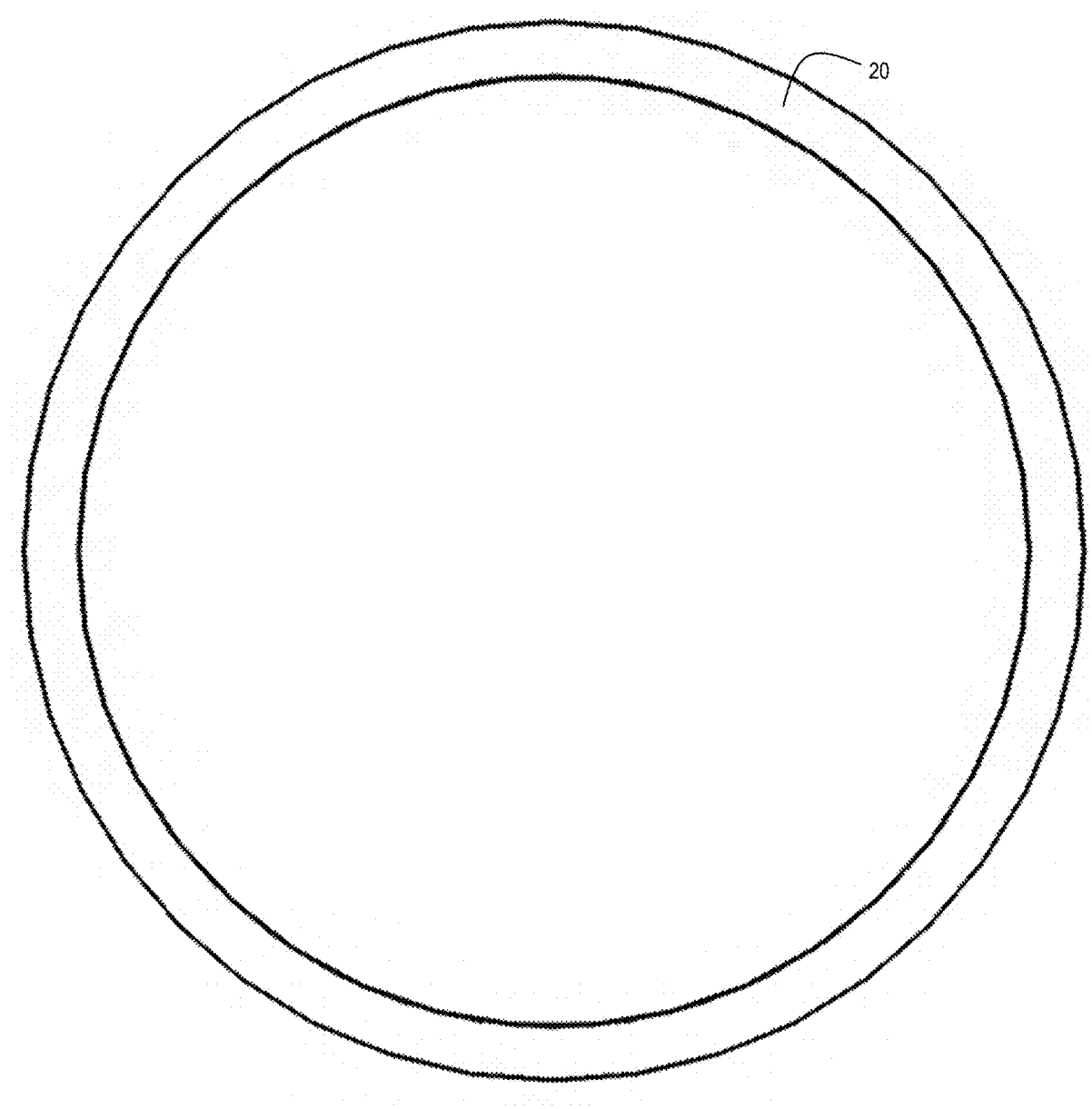
FIG. 5 is a front view of a tube plug according to the present invention.

Referring to the figures, wherein like numeral refer to like parts throughout, there is seen in FIGS. 1 through 3 a tube plug 10 made in accordance with the present invention. Plug 10 comprises a housing member 12 and an insert member 14 that can be advanced into housing member 12. Housing member 12 has non-cylindrical body 16, the rear portion of which is formed with a large open bore 18. Bore 18 is surrounded by relatively thin wall 20 that is deformable and will expand outwardly to provide a seal with a cylindrical opening, such as the aperture of a tube sheet in response to advancement of insert member 14 into bore 18. Non-cylindrical body 16 tapers from a larger outer diameter at the rear end 22 of non-cylindrical body 16 and proximate to insert member 14 to a smaller outer diameter at the front 24 of non-cylindrical body 16. As seen in FIG. 1, housing member 12 may have a cylindrical body 26 extending integrally from the front 24 of the non-cylindrical body 16.

Referring to FIG. 2, insert member 14 comprises a head 40 coupled to a threaded shank 42 that extends into bore 18 and into engagement with a second bore 44 of cylindrical body 26 having internal threads that is in communication with bore 18. A ferrule 46 having a taper corresponding to non-cylindrical body 16 is rotatably mounted on shank 42. Rotation of head 40 will therefore cause insert member to advance into bore 18 so that tapered ferrule 46 forces wall 20 outwardly into secure engagement with the inner diameter of a tube to be plugged. Head 40 may have a hex socket 52 for ease of installation. Shank 42 may be formed integrally with ferrule 46 as s single unit, or as illustrated using separate structure.

Figure 6:
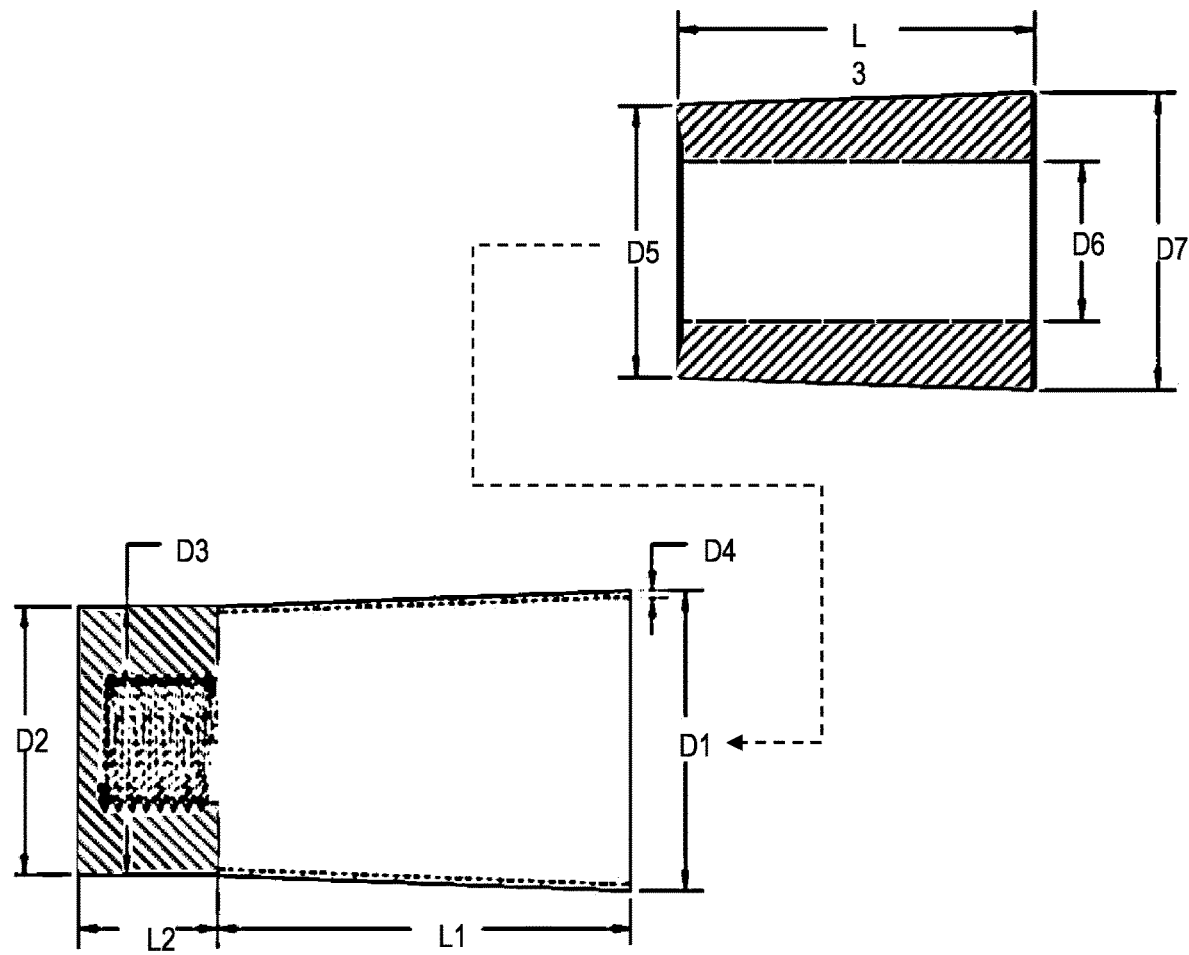
FIG. 6 is a cross-sectional view of a housing member according to the present invention showing preferred dimensions.

Referring to FIG. 6, the dimensions of plug 10 are configured to provide for easy installation in a tube. For example, non-cylindrical body 16 may extend along length L1 from diameter D1 to diameter D2. Cylindrical body 26 may extend along length L2 with constant diameter D3

(which may be equal to D2). Wall 20 has a thickness of D4, so bore 18 has diameter equal to D1 minus D4. Ferrule 46 tapers along length L3 from diameter D5 to diameter D7 and has a through bore of diameter D6 to accommodate and allow threaded shank 42 to pass therethrough and engage threaded inner bore 44 of cylindrical body 26.

Figure 7:
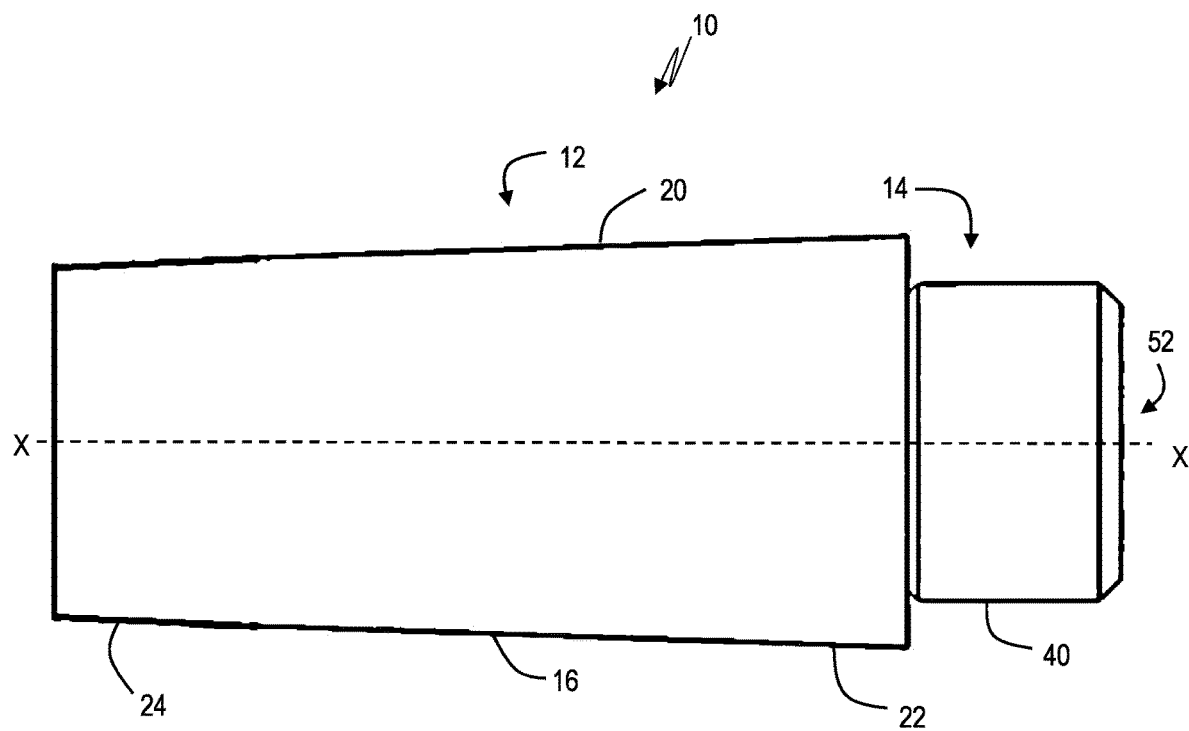
FIG. 7 is a side view of another embodiment of tube plug according to the present invention.

Referring to FIG. 7, plug 10 may omit cylindrical body 26 so that housing member 12 comprises only non-cylindrical body 16 extending from rear end 22 to front end 24

In an exemplary embodiment, tube plug 10 may be dimensioned as set forth in Table 1 below:

TABLE 1

| Dimension | Value (inches or degrees) |
| --- | --- |
| D1 | 0.975 |
| D2 | 0.875 |
| D3 | 0.975 |
| D4 | 0.020 |
| D5 | 0.856 |
| D6 | 0.934 |
| D7 | 0.934 |
| L1 | 1.500 |
| L2 | 0.500 |
| L3 | 1.250 |

In the example above, D7 is based on the larger diameter of non-cylindrical body 16 minus two times the thickness of wall 20, with insert member 14 sized to match the interior surface of non-cylindrical body 16 along the length of ferrule 46.

It should be recognized that tube plug 10 may be made in virtually any size, including devices having outside diameters up to or exceeding three inches or down to outside diameters of one-half inch or perhaps less, and thus may be used with conventional heat exchangers and air cooled heat exchangers. In use, tube plug 10 should be selected so that the larger diameter of non-cylindrical body 16 is equal to or larger than the outside diameter of the tube to be plugged. The smaller diameter of non-cylindrical body 16 should be smaller than the inside diameter of the tube to be plugged. As a result, the small diameter allows plug 10 to be inserted into the tube, while the larger diameter prevent plug 10 from sliding all the way into the tube to be plugged. The expansion area of plug 10 is thus located against the inside diameter surface at the entry of the tube to be plugged.

Figure 8:
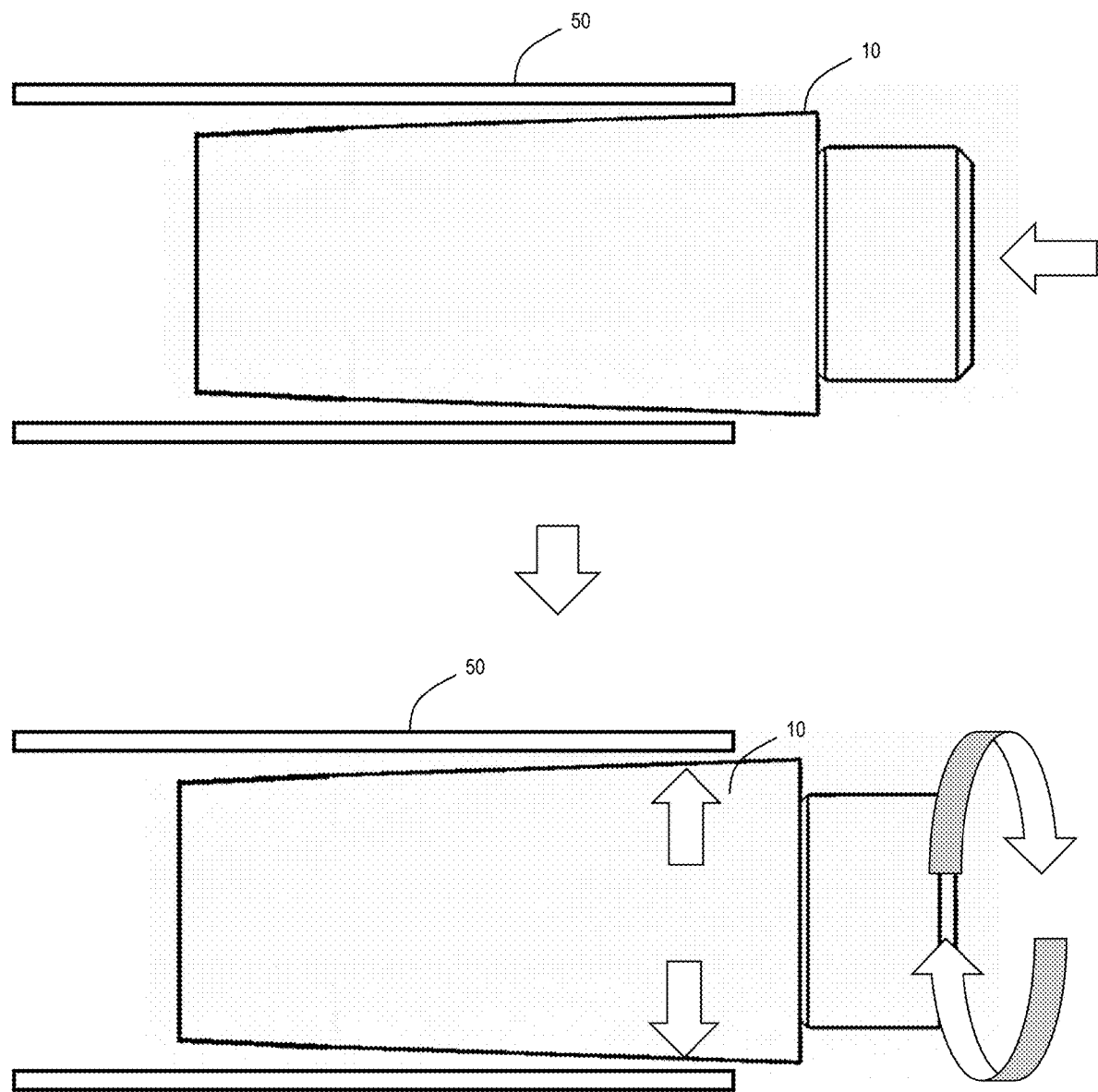
FIG. 8 is an illustration of a method of sealing a heat exchanger tube according to the present invention.

Referring to FIG. 8, tube plug 10 is seated in an exemplary heat exchanger tube 50 to be sealed and then tapped longitudinally into tube 50 to seat or secure it in place. Threaded shank 42 is then rotated, such as by rotating head 40, using a predetermined amount of torque (or maximum amount of torque) to control the amount of outward deformation of deformable thin wall 20. As is known in the art, tube plug 10 may be sized for use in tubes having various inner diameters, with the dimensions of housing member 12 and insert member 14 changed proportionally. Because of non-cylindrical body 16, plug 10 may be used to plug variously sized tubes in a given system. In addition, as plug is secured in place by the rotation of head 40 rather than simply driving plug 10 longitudinally into a tube through a violent hammering action, the amount of force applied to plug 10 during installation can be precisely controlled, such as by using a hex capture driver, that also provides a long reach for the difficult positioning of tubes in a fin fan heat exchangers. The expansion of tube plug 10 and controlled torque installation guarantees a consistent seal without risking damage to the tubesheet or adjacent tubes. The expansion of non-cylindrical body 16 also creates a larger sealing area by deforming thin wall 20 to compress into the tube ID at the point of contact, thus providing increased sealing capacity compared to traditional tapered one-piece plugs. The means of expansion and tube sealing and the variability of sizing to fit multiple tubes are a stark departure from existing expansion plugs.

What is claimed is:

1. A tube plug, comprising:
    a housing member having a non-cylindrical body with a deformable wall continuously surrounding an inner bore and a cylindrical body extending from the non-cylindrical body and including a threaded bore in communication with the inner bore, wherein the non-cylindrical body and the cylindrical body extend along a longitudinal axis;
    an insert member having a threaded shank corresponding to the threaded bore and a ramped ferrule coupled to the threaded shank and positioned in the inner bore of the housing member adjacent to the deformable wall so that rotation of the threaded shank in the threaded bore will advance the ramped ferrule into the inner bore to deform the deformable wall of the non-cylindrical body outwardly.

2. The tube plug of claim 1, wherein the non-cylindrical body tapers from a first outer diameter at a rear of the non-cylindrical body to a second outer diameter at a front of the non-cylindrical body that is smaller than the first outer diameter.

3. The tube plug of claim 2, wherein the inner bore of the non-cylindrical body tapers from a first inner diameter at a rear of the non-cylindrical body to a second inner diameter at a front of the non-cylindrical body that is smaller than the first inner diameter.

4. The tube plug of claim 3, wherein the ramped ferrule tapers from a third outer diameter proximate to the rear of the non-cylindrical body to a fourth outer diameter proximate to the front of the non-cylindrical body.

5. The tube plug of claim 4, wherein the ramped ferrule is rotatably mounted about the threaded shank.

6. The tube plug of claim 5, wherein the threaded shank of the insert member includes a head.

7. The tube plug of claim 6, wherein the threaded shank including the head comprises a hex head screw.

8. A method of sealing a leaking element of a heat exchanger, comprising the steps of:
    providing a tube plug having a housing member and an insert member, wherein the housing member has a non-cylindrical body with a deformable wall that surrounds an inner bore and a cylindrical body that extends from the non-cylindrical body and has a threaded bore in communication with the inner bore, and wherein the insert member has a threaded shank corresponding to the threaded bore and a ramped ferrule coupled to the threaded shank and positioned in the inner bore of the housing member adjacent to the deformable wall;
    seating the tube plug at least partially into a tube of the heat exchanger so that the cylindrical body and at least part of the non-cylindrical body of the tube plug extend longitudinally into the tube; and
    rotating the threaded shank of the insert member so that the ramped ferrule is advanced into the inner bore, thereby deforming the deformable wall of the non-cylindrical body outwardly into the tube of the heat exchanger.

9. The method of claim 8, wherein the non-cylindrical body tapers from a first outer diameter at a rear of the non-cylindrical body to a second outer diameter at a front of the non-cylindrical body that is smaller than the first outer diameter.

10. The method of claim 9, wherein the inner bore of the non-cylindrical body tapers from a first inner diameter at a rear of the non-cylindrical body to a second inner diameter at a front of the non-cylindrical body that is smaller than the first inner diameter.

11. The method of claim 10, wherein the ramped ferrule tapers from a third outer diameter proximate to the rear of the non-cylindrical body to a fourth outer diameter proximate to the front of the non-cylindrical body.

12. The method of claim 11, wherein the ramped ferrule is rotatably mounted about the threaded shank.

13. The method of claim 12, wherein the threaded shank of the insert member includes a head.

14. The method of claim 13, wherein the threaded shank including the head comprises a hex head screw.

\* \* \* \* \*